(12) United States Patent
Chai et al.

(10) Patent No.: US 10,486,196 B2
(45) Date of Patent: Nov. 26, 2019

(54) LINEAR VIBRATOR

(71) Applicant: AAC Technologies Pte. Ltd., Singapore (SG)

(72) Inventors: Zhilin Chai, Shenzhen (CN); Wenli Wang, Shenzhen (CN); Hongfu Xu, Shenzhen (CN); Fanghua Ling, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 234 days.

(21) Appl. No.: 15/659,044

(22) Filed: Jul. 25, 2017

(65) Prior Publication Data

US 2018/0297077 A1 Oct. 18, 2018

(30) Foreign Application Priority Data

Apr. 14, 2017 (CN) ..................... 2017 2 0420666 U

(51) Int. Cl.
| | | |
|---|---|---|
| B06B 1/04 | (2006.01) | |
| H02K 33/02 | (2006.01) | |
| H02K 33/18 | (2006.01) | |
| H02K 33/16 | (2006.01) | |

(52) U.S. Cl.
CPC .............. B06B 1/045 (2013.01); H02K 33/02 (2013.01); H02K 33/16 (2013.01); H02K 33/18 (2013.01)

(58) Field of Classification Search
CPC ........ B06B 1/045; H02K 33/16; H02K 33/02; H02K 33/18
USPC ......................................................... 310/25
See application file for complete search history.

(56) References Cited

U.S. PATENT DOCUMENTS

| | | | | |
|---|---|---|---|---|
| 8,253,282 | B2 * | 8/2012 | Park .................. | H02K 33/16 310/25 |
| 8,258,657 | B2 * | 9/2012 | Kim .................. | H02K 15/02 310/28 |
| 8,278,786 | B2 * | 10/2012 | Woo .................. | H02K 33/16 310/15 |
| 8,410,642 | B2 * | 4/2013 | Dong ................. | H02K 33/16 310/25 |

(Continued)

FOREIGN PATENT DOCUMENTS

| | | | |
|---|---|---|---|
| JP | 2017029969 A | * | 2/2017 |
| JP | 2017085849 A | * | 5/2017 |
| JP | 2017094317 A | * | 6/2017 |

*Primary Examiner* — Alex W Mok
(74) *Attorney, Agent, or Firm* — IPro, PLLC; Na Xu

(57) ABSTRACT

The present application provides a linear vibration motor, including a base, a vibrating unit and an elastic member. The elastic member includes a first elastic member and a second elastic member, the base includes two side plates facing toward each other along the vibrating direction of the vibrating unit, the first elastic member includes a first fixing arm fixed at the vibrating unit, two first elastic arms extending from the first fixing arm and two first connecting arms bending and extending from ends of two first elastic arms; the second elastic member includes a second fixing arm fixed at the vibrating unit, two second elastic arms bending and extending from two ends of the second fixing arm and two second connecting arms extending from the two second elastic arms; and the two first connecting arms and two second connecting arms are fixed at the two side plates, respectively.

9 Claims, 5 Drawing Sheets

(56) References Cited

U.S. PATENT DOCUMENTS

| | | | | |
|---|---|---|---|---|
| 8,648,502 B2* | 2/2014 | Park | ................. | H02K 33/16 310/15 |
| 8,766,494 B2* | 7/2014 | Park | ................. | H02K 35/02 310/25 |
| 9,024,489 B2* | 5/2015 | Akanuma | ............ | H02K 33/16 310/15 |
| 2009/0267423 A1* | 10/2009 | Kajiwara | ............ | H02K 33/02 310/36 |
| 2011/0127858 A1* | 6/2011 | Park | ................. | B06B 1/045 310/25 |
| 2011/0156500 A1* | 6/2011 | Dong | .............. | H02K 33/16 310/25 |
| 2011/0241451 A1* | 10/2011 | Park | ................. | B06B 1/045 310/25 |
| 2012/0032535 A1* | 2/2012 | Park | ................. | H02K 35/02 310/25 |
| 2012/0049660 A1* | 3/2012 | Park | ................. | B06B 1/045 310/25 |
| 2012/0169148 A1* | 7/2012 | Kim | ................. | H02K 33/16 310/25 |
| 2012/0187780 A1* | 7/2012 | Bang | ................ | H02K 33/16 310/25 |
| 2013/0221767 A1* | 8/2013 | Akanuma | ............ | H02K 33/02 310/15 |
| 2013/0229070 A1* | 9/2013 | Akanuma | ............ | H02K 33/00 310/25 |
| 2016/0181900 A1* | 6/2016 | Xu | .................. | H02K 33/16 310/12.27 |
| 2016/0181902 A1* | 6/2016 | Xu | .................. | H02K 33/16 310/17 |

* cited by examiner

LINEAR VIBRATOR

TECHNICAL FIELD

The present application relates to a vibration motor and, particularly, relates to a linear vibration motor applied in the field of mobile electronic products.

BACKGROUND

With the development of electronic techniques, portable consumable electronic products have become more and more popular, for example, cell phones, hand-held game players, navigation devices or hand-held multimedia entertainment equipment, etc. These electronic products generally adopt a linear vibration motor for systematic feedbacks, for example, incoming call prompt and message prompt of cell phones, navigation prompt, and vibrating feedback of game player, etc. Such a wild application requires the vibration motor to have excellent performance and longer service life.

A linear vibration motor in the relevant art includes a base having accommodating space, a vibrating unit located in the accommodating space, an elastic member which fixes and suspends the vibrating unit in the accommodating space, and a coil fixed at the base. A magnetic field generated by the coil and a magnetic field generated by the vibrating unit interact with each other, which drives the vibrating unit to move reciprocally and linearly so as to generate vibration.

However, in the relevant art, in order to increase elasticity of the elastic member of the linear vibration motor, two elastic members are provided and the two elastic members are in cross arrangement and respectively clamp the vibrating unit. Each of the elastic members includes a fixing arm, elastic arms which respectively bend and extend from two ends of the fixing arm, and connecting arms which respectively bend and extend from the elastic arms. The fixing arm and the connecting arms are respectively located at two opposite sides of the vibrating unit along a direction perpendicular to a vibrating direction of the vibrating unit, and are respectively fixed at the vibrating unit and the base. Thus, in relevant art, the elastic arm is formed with two bendings, and the fixing arm or the connecting arms are fixed at the long-axis side plate of the base, which is difficult to manufacture and inefficient to assemble.

Thus, it is necessary to provide a new linear vibration motor to solve the above-mentioned problem.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EXEMPLARY EMBODIMENTS

The present application is further illustrated with reference to exemplary embodiments and accompanying drawings.

Figure 1:
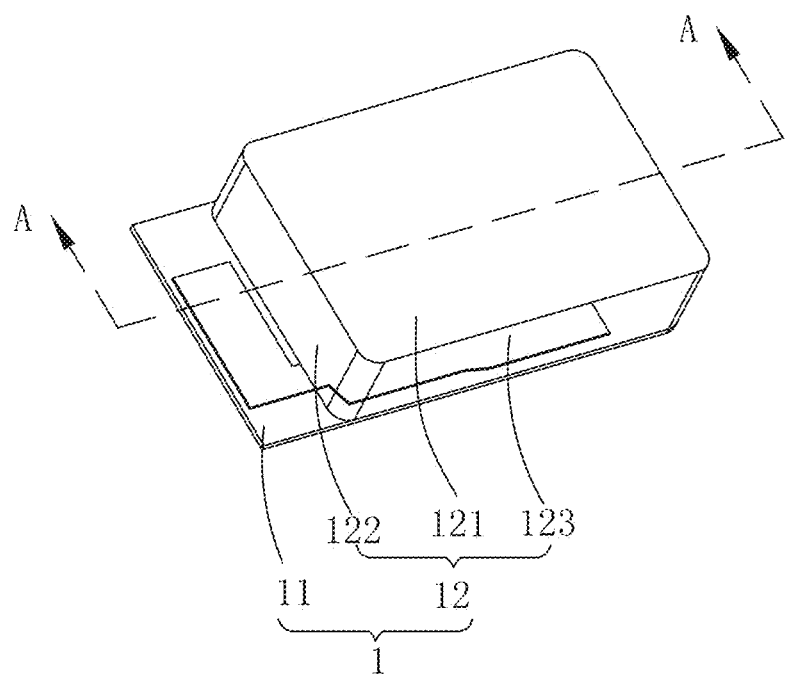
FIG. 1 is a perspective structural view of a linear vibration motor according to an exemplary embodiment of the present application.
Figure 2:
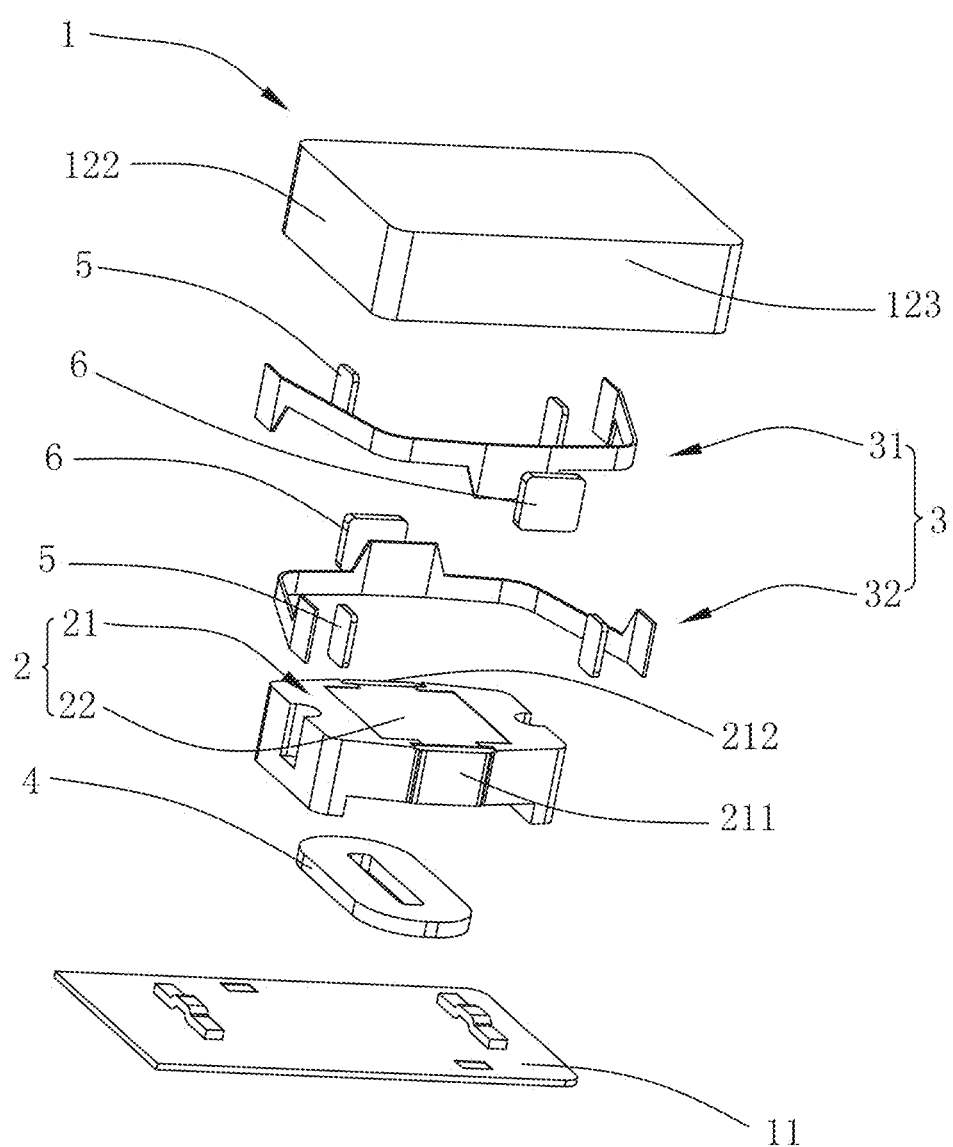
FIG. 2 is an exploded perspective structural view of a linear vibration motor according to an exemplary embodiment of the present application.
Figure 3:
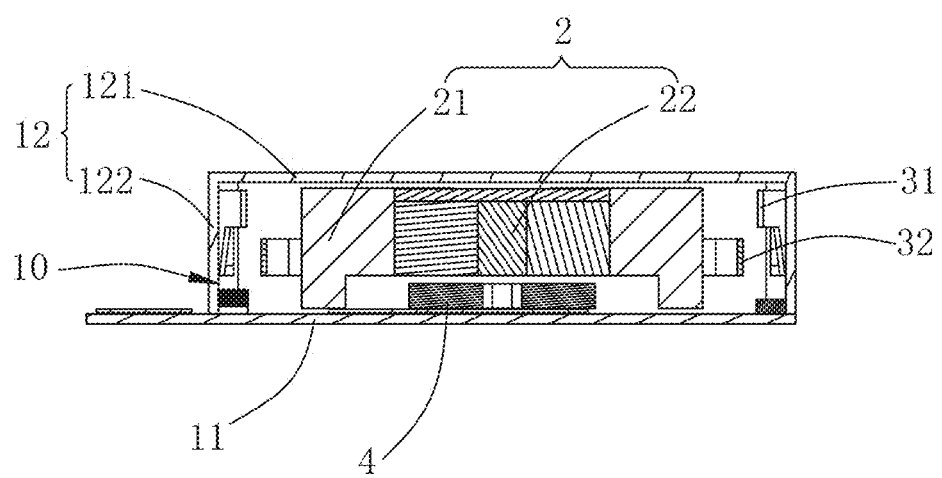
FIG. 3 is a sectional view of the linear vibration motor in FIG. 1 along line A-A.

With reference to FIGS. 1-3, FIG. 1 is a perspective structural view of a linear vibration motor according to an exemplary embodiment of the present application; FIG. 2 is an exploded perspective structural view of a linear vibration motor according to an exemplary embodiment of the present application; FIG. 3 is a sectional view of the linear vibration motor in FIG. 1 along line A-A. The present application provides a linear vibration motor 100. The linear vibration motor 100 includes a base 1, a vibrating unit 2, an elastic member 3, a coil 4, a first block 5 and a second block 6. The base 1 includes accommodating space 10. The vibrating unit 2 is located in the accommodating space 10. The elastic member 3 is configured to fix and suspend the vibrating unit 2 in the accommodating space 10. The coil 4 is fixed at the base 1 and configured to drive the vibrating unit 2 to vibrate.

The base 1 includes a bottom plate 11 and a top cover 12. The top cover 12 covers the bottom plate 11. The bottom plate 11 and the top cover 12 cooperatively define the accommodating space 10.

The top cover 12 includes a top plate 121, two side plates 122 and two connecting plates 123. The top plate 121 and the bottom plate 11 face towards each other. The top plate 121 bends and extends towards the bottom plate 11 so as to form the two side plates 122, and the two side plate 122 are arranged opposite to and spaced from each other along the vibrating direction of the vibrating unit 2. The two connecting plates 123 are spaced from each other. The two connecting plates 123 are connected with the two side plates 122, respectively. In an exemplary embodiment, the base 1 is rectangular, and the two side plates 122 are located in a short-axis direction of the base 1, the connecting plates 123 are located in a long-axis direction of the base 1, and the long-axis direction of the base 1 is the vibrating direction of the vibrating unit 2.

Figure 4:
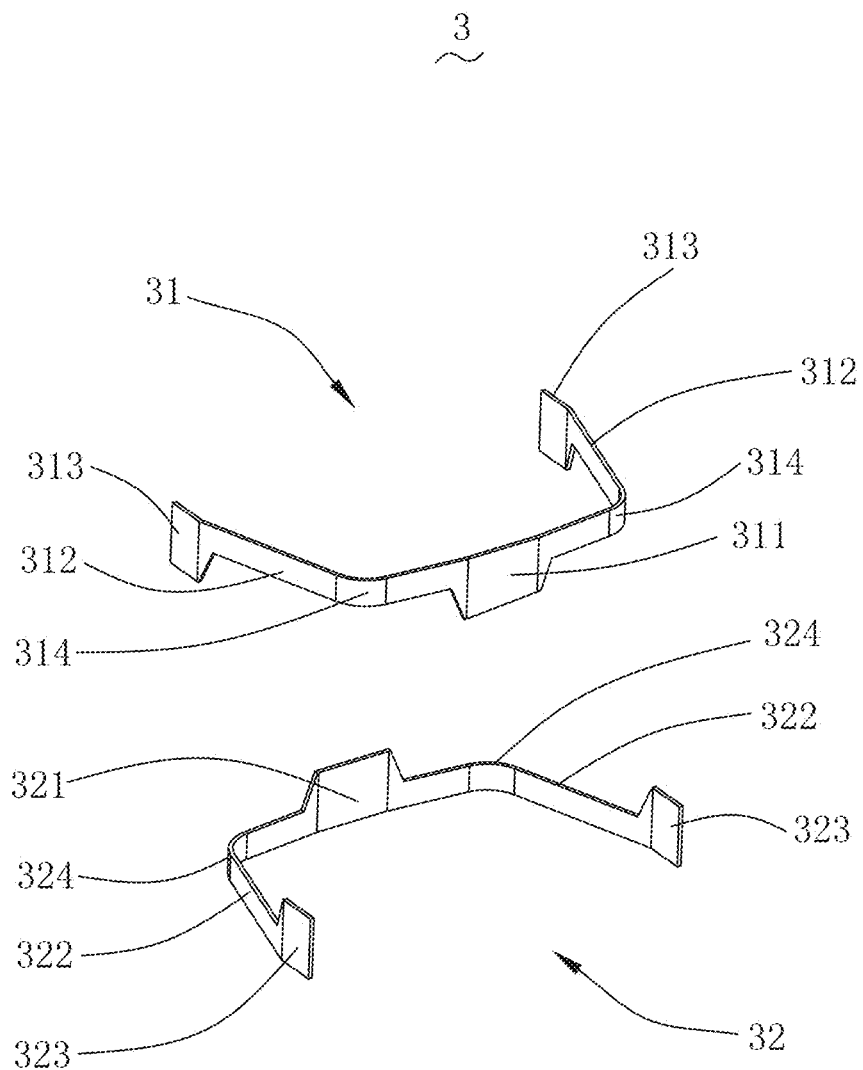
FIG. 4 is a perspective structural view of an elastic member of a linear vibration motor according to an exemplary embodiment of the present application.
Figure 5:
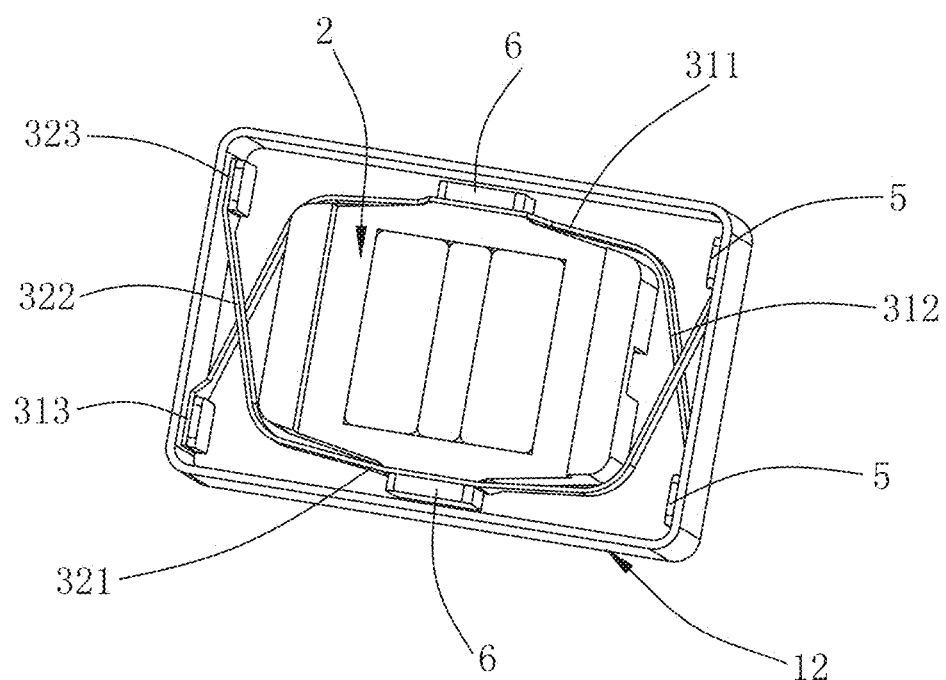
FIG. 5 is a structural schematic diagram of an assembling structure of an elastic member, a vibrating unit and a base of a linear vibration motor according to an exemplary embodiment of the present application.

The vibrating unit 2 includes a weight 21 and a magnet 22. The magnet 22 is embedded in the weight 21. The vibrating unit 2 includes a first side wall 211 and a second side wall 212. The first side wall 211 and the second side wall 212 face away from one another along a direction perpendicular to the vibrating direction of the vibrating unit 2. With reference to FIGS. 4-5, FIG. 4 is a perspective structural view of an elastic member of a linear vibration motor according to an exemplary embodiment of the present application; FIG. 5 is a structural schematic diagram of an assembling structure of an elastic member, a vibrating unit and a base of a linear vibration motor according to an exemplary embodiment of the present application. The elastic member 3 includes a first elastic member 31 and a second elastic member 32. The first elastic member 31 and the second elastic member 32 are spaced from each other. The arrangement of double elastic members allows more balanced vibration effect of the linear vibration motor 100.

In an exemplary embodiment, the first elastic member 31 and the second elastic member 32 are structured in a same form, and the two give way to each other and are matched in opposite directions during assembling. The specific assembling manner is as follows:

The first elastic member 31 includes a first fixing arm 311, two first elastic arms 312 and two first connecting arms 313. The first fixing arm 311 is fixed at the first side wall 211, the two first elastic arms 312 respectively bend and extend from two ends of the first fixing arm 311 and around the vibrating unit 2 towards the two side plates 122 of the base 1 which are distributed in the vibrating direction, and two first connecting arms 313 respectively extend from two end portions of the two first elastic arms 312 and are respectively fixed on the corresponding side plates 122.

The first fixing arm 311 and the first elastic arms are obliquely arranged, and an included angle between the first fixing arm 311 and the first elastic arm 312 is an obtuse angles. Preferably, a connection between the first fixing arm 311 and the first elastic arm 312 is an arc shaped transition which forms a first bending portion 314, so that the first elastic member 31 can extend and bend with sufficient amplitude around the vibrating unit 2 and generate large elasticity.

The second elastic member 32 includes a second fixing arm 321, two second elastic arms 322 and two second connecting arms 323. The second fixing arm 321 is fixed at the second side wall 212. The two second elastic arms 322 bend and extend from two ends of the second fixing arm 321 and surround the vibrating unit 2 towards two side plates 122 of the base 1 which are distributed in the vibrating direction, respectively. The two second connecting arms 323 extend from two ends of the two second elastic arms 322 and are fixed on the corresponding side plates 122, respectively. The second fixing arm 321 and the two second elastic arms 322 are obliquely arranged, and an included angle between the second fixing arm 321 and each of the two second elastic arms 322 is an obtuse angle. Preferably, a connection between the second fixing arm 321 and the second elastic arm 322 is an arc shaped transition which forms a first bending portion 324, so that the second elastic member 32 can extend and bend with sufficient amplitude around the vibrating unit 2 and generate large elasticity.

In an exemplary embodiment, the first elastic members 31 are structured in axial symmetry, and the second elastic members 32 are structured in axial symmetry, i.e., symmetrical with respect to a central axis going through the geometric center of the vibrating unit 2 and perpendicular to the vibrating direction of the vibrating unit 2. Thus, the manufacturing of the first elastic members 31 and the second elastic members 32 is simplified, which allows automatic assembling of the products and significantly improves the assembling efficiency.

Besides, a projection of the first elastic arm 312 on the bottom plate 11 and a projection of the second elastic arm 322 on the bottom plate 11 intersect with each other. A distance between each first elastic arm 312 and the bottom plate 11 is greater than a distance between each second elastic arm 322 and the bottom plate 11.

The first elastic member 31 and the second elastic member 32 are assembled to face away from one another, so as to form an overlapping structure in opposite directions, which is simple to assemble and has high assembling efficiency. Additionally, the first elastic arm 312 and the second elastic arms 322 are respectively formed by means of a bending structure, which reduces the processing difficulties of the elastic member 3.

The coil 4 is fixed at the bottom plate 11, and the coil 4 directly faces the magnet 22 and the coil 4 is spaced from the magnet 22. A magnetic field generated by the coil 4 after being energized interacts with the magnetic field of the magnet 22, so as to drive the vibrating unit 2 to move reciprocally and linearly so as to generate vibration.

A plurality of first blocks 5 is provided and, specifically, the present embodiment includes four first blocks 5. The four first blocks 5 are fixed at sides of the first connecting arms 313 and/or the second connecting arms 323 away from the side plates 122. The first blocks 5 is configured to, on the one hand, prevent the weight 21 from directly impacting the first elastic member and/or the second elastic member and, on the other hand, to strengthen the fixing fastness and stability of the elastic member 3 and the base.

At least two second blocks 6 are provided. The second blocks 6 are fixed at a side of the first fixing arm 311 far away from the first side wall 211 and/or a side of the second fixing arm 321 far away from the second side wall 212, respectively. Such arrangement can prevent the weight 21 from directly impacting the base 1, and strengthen the fixing fastness between the first fixing arms 311 and the vibrating unit 2 and between the second fixing arms 321 and the vibrating unit 2, so as to prevent the elastic member 3 from falling off the vibrating unit 2.

Compared with the relevant art, the linear vibration motor of the present application is configured in that: the first fixing arm and the second fixing arm are fixed at two opposite sides of the vibrating unit facing away from one another in a direction intersecting the vibrating direction, respectively; the first elastic member and the second elastic member are located at two opposite sides of the base facing toward each other along the vibrating direction, respectively; and each of the first elastic member and the second elastic member are formed by means of a bending structure. Thus, the structure of the elastic member is simplified, the processing difficulties are reduced and the assembling efficiency is improved.

The above are merely exemplary embodiments of the present application, which are not intended to limit the patent scope of the present application, all equivalent structures or equivalent flow variations or direct/indirect application in other relevant technical field made based on the contents of the description and drawings of the present application shall fall into the protection scope of the present application.

What is claimed is:
1. A linear vibration motor, comprising:
a base defining accommodating space;
a vibrating unit located in the accommodating space and comprising a first side wall and a second side wall, wherein the first side wall and the second side wall face towards each other along a direction perpendicular to a vibrating direction of the vibrating unit; and
an elastic member configured to fix and suspend the vibrating unit in the accommodating space and comprising a first elastic member and a second elastic member, wherein the first elastic member and the second elastic member are spaced from each other;
wherein the base comprises two side plates, and the two side plates face toward each other and are spaced from each other along the vibrating direction of the vibrating unit;
the first elastic member comprises a first fixing arm, two first elastic arms and two first connecting arms; the first fixing arm is fixed at the first side wall; each first elastic arm extends linearly from an end of the first fixing arm, and then bends and extends linearly towards an end of the side plate distal to the first fixing arm to fix on the first connecting arm;

the second elastic member comprises a second fixing arm, two second elastic arms and two second connecting arms; the second fixing arm is fixed at the second side wall; each second elastic arm extends linearly from an end of the second fixing arm, and then bends and extends linearly towards an end of the side plate distal to the second fixing arm to fix on the second connecting arm.

2. The linear vibration motor as described in claim 1, wherein the first fixing arm and the two first elastic arms are obliquely arranged, and an included angle between the first fixing arm and each of the two first elastic arms is an obtuse angle; the second fixing arm and each of the two second elastic arms are obliquely arranged, and an included angle between the second fixing arm and each of the two second elastic arms is an obtuse angle.

3. The linear vibration motor as described in claim 1, wherein a connection between the first fixing arm and each of the two first elastic arms is an arc shaped transition which forms a first bending portion, and a connection between the second fixing arm and each of the two second elastic arms is an arc shaped transition which forms a second bending portion.

4. The linear vibration motor as described in claim 1, wherein the base comprises a bottom plate and a top cover, the top cover covers the bottom plate, the top cover comprises the two side plates and two connecting plates, the two connecting plates respectively connect the two side plates; projections of the two first elastic arms on the bottom plate and projections of the two second elastic arm on the bottom plate intersect with each other.

5. The linear vibration motor as described in claim 4, wherein a distance between each first elastic arm and the bottom plate is greater than a distance between each second elastic arm and the bottom plate.

6. The linear vibration motor as described in claim 1, further comprising a plurality of first blocks, wherein the plurality of first blocks are fixed at sides of the first connecting arms and/or the second connecting arms away from the two side plates.

7. The linear vibration motor as described in claim 1, further comprising a second block, wherein the second block is fixed at a side of the first fixing arm away from the first side wall and/or a side of the second fixing arm away from the second side wall.

8. The linear vibration motor as described in claim 1, wherein the first elastic member and the second elastic member are both structured in axial symmetry, symmetrical with respect to a central axis going through the geometric center of the vibrating unit and perpendicular to the vibrating direction of the vibrating unit.

9. The linear vibration motor as described in claim 1, wherein the first elastic member and the second elastic member are arranged towards opposite directions to face each other.

* * * * *